United States Patent
Raffman et al.

(10) Patent No.: US 10,157,155 B2
(45) Date of Patent: *Dec. 18, 2018

(54) OPERATING SYSTEM-MANAGED INTERRUPT STEERING IN MULTIPROCESSOR SYSTEMS

(71) Applicant: Microsoft Technology Licensing, LLC, Redmond, WA (US)

(72) Inventors: Andrew Raffman, Redmond, WA (US); Minsang Kim, Redmond, WA (US); Jason Wohlgemuth, Duvall, WA (US); Tristan Brown, Bellevue, WA (US); Youssef Barakat, Bothell, WA (US); Omid Fatemieh, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 107 days.

This patent is subject to a terminal disclaimer.

(21) Appl. No.: 15/241,104

(22) Filed: Aug. 19, 2016

(65) Prior Publication Data

US 2016/0357689 A1 Dec. 8, 2016

Related U.S. Application Data

(63) Continuation of application No. 13/917,634, filed on Jun. 13, 2013, now Pat. No. 9,424,212.

(51) Int. Cl.
*G06F 13/24* (2006.01)
*G06F 9/50* (2006.01)
(Continued)

(52) U.S. Cl.
CPC ............ *G06F 13/24* (2013.01); *G06F 9/5083* (2013.01); *G06F 11/3024* (2013.01);
(Continued)

(58) Field of Classification Search
CPC .... G06F 13/24; G06F 9/5083; G06F 11/3024; G06F 11/3419; G06F 11/3433
(Continued)

(56) References Cited

U.S. PATENT DOCUMENTS 5,446,910 A   8/1995   Kennedy et al.
5,944,840 A   8/1999   Lever
(Continued)

FOREIGN PATENT DOCUMENTS

CN   1737765 A      2/2006
CN   101872315 A    10/2010
WO   2013066124 A1  5/2013

OTHER PUBLICATIONS

Structured Computer Organization, Third Edition, Andrew S. Tanenbaum pp. 11-13 (Year: 1990).*
(Continued)

*Primary Examiner* — Paul R. Myers
(74) *Attorney, Agent, or Firm* — Patent GC LLC (57) ABSTRACT

An operating system includes an interrupt router that dynamically steers each interrupt to one or more processors within set of processors based on overall load information from the set of processors. An interrupt source is assigned to a processor based on the load imposed by the interrupt source and the target overall load for the processor. For example, each processor can maintain information about each interrupt it processes over time. The operating system receives this historical load information to determine an expected load for interrupts of a given type from a given device, an overall load on the system, and a target load for each processor. Given a set of interrupt sources, their expected loads, and target load for each processor, each interrupt source can be assigned dynamically to a processor
(Continued)

during runtime of the system. These assignments can be changed given current operating conditions of the system.

20 Claims, 7 Drawing Sheets

(51) Int. Cl.
  *G06F 11/34* (2006.01)
  *G06F 11/30* (2006.01)
(52) U.S. Cl.
  CPC ...... *G06F 11/3419* (2013.01); *G06F 11/3433* (2013.01); *G06F 11/3466* (2013.01); *G06F 2201/835* (2013.01); *G06F 2201/865* (2013.01); *Y02D 10/14* (2018.01); *Y02D 10/34* (2018.01)
(58) Field of Classification Search
  USPC .......................................................... 710/260
  See application file for complete search history.

(56) References Cited

U.S. PATENT DOCUMENTS

| | | | |
|---|---|---|---|
| 6,237,058 | B1 | 5/2001 | Nakagawa |
| 6,604,136 | B1* | 8/2003 | Chang ................ G06F 9/54 709/223 |
| 6,813,665 | B2 | 11/2004 | Rankin et al. |
| 7,328,294 | B2 | 2/2008 | Kim et al. |
| 7,581,052 | B1 | 8/2009 | Solomita |
| 7,694,055 | B2 | 4/2010 | Orita et al. |
| 7,761,720 | B2 | 7/2010 | Kaushik et al. |
| 7,805,555 | B2 | 9/2010 | Takata et al. |
| 7,962,771 | B2 | 6/2011 | Song et al. |
| 8,032,681 | B2 | 10/2011 | Crossland et al. |
| 8,321,614 | B2 | 11/2012 | Wolfe |
| 8,996,773 | B2 | 3/2015 | Ho et al. |
| 9,032,127 | B2 | 5/2015 | Fischer et al. |
| 9,424,212 | B2* | 8/2016 | Raffman ................ G06F 9/5083 |
| 2002/0124196 | A1 | 9/2002 | Morrow et al. |
| 2003/0061423 | A1 | 3/2003 | Rankin et al. |
| 2003/0105798 | A1 | 6/2003 | Kim et al. |
| 2003/0120702 | A1 | 6/2003 | Jahnke |
| 2003/0200250 | A1* | 10/2003 | Kiick .................... G06F 9/4812 718/102 |
| 2005/0125582 | A1 | 6/2005 | Tu et al. |
| 2006/0123422 | A1 | 6/2006 | Felter et al. |
| 2007/0005742 | A1 | 1/2007 | Eldar et al. |
| 2007/0043970 | A1 | 2/2007 | Solomita et al. |
| 2007/0143514 | A1 | 6/2007 | Kaushik et al. |
| 2009/0089470 | A1 | 4/2009 | Ven |
| 2010/0057967 | A1 | 3/2010 | Murakami et al. |
| 2011/0145461 | A1 | 6/2011 | Zhao et al. |
| 2014/0359184 | A1 | 12/2014 | Kang et al. |

OTHER PUBLICATIONS

"Chapter 4. Interrupts and Exceptions", Retrieved from: <<http://linux.linti.unlp.edu.ar/images/0/0c/ULK3-CAPITULO4-UNNOBA.pdf>>, Retrieved on: Mar. 4, 2013, 52 Pages.
"Final Office Action Issued in U.S. Appl. No. 13/917,634", dated Nov. 25, 2015, 8 Pages.
"Non-Final Office Action Issued in U.S. Appl. No. 13/917,634", dated Aug. 4, 2015, 8 Pages.
"Notice of Allowance Issued in U.S. Appl. No. 13/917,634", dated Apr. 27, 2016, 5 Pages.
McDougall, et al., "Chapter 3.11—Interrupts", In Book—Solaris Internals: Solaris 10 and OpenSolaris Kernel Architecture, Second Edition, A Prentice Hall Publication, Jul. 10, 2006, 7 Pages.
Mukherjee, Satyaki, "Migrating Software to Multicore SMP", Retrieved from: <<http://www.arm.com/files/pdf/AT-_Migrating_Software_to_Multicore_SMP_Systems.pdf>>, Retrieved on: Mar. 4, 2013, 39 Pages.
"International Search Report & Written Opinion Issued in PCT Application No. PCT/US2013/060243", dated Feb. 25, 2014, 12 Pages.
Tumeo, et al., "An Interrupt Controller for FPGA-based Multiprocessors", In Proceedings of International Conference on Embedded Computer Systems: Architectures, Modeling and Simulation, Jul. 16, 2007, pp. 82-87.
"Summons to attend Oral Proceedings Issued in European Patent Application No. 13777361.0", Mailed Date: Oct. 12, 2017, 8 Pages.
"Office Action Issued in European Patent Application No. 13777361.0", dated Nov. 11, 2016, 6 Pages.
"Office Action Issued in Chinese Patent Application No. 201380077383.6", dated Mar. 5, 2018, 9 Pages. (W/o English Translation).

* cited by examiner

OPERATING SYSTEM-MANAGED INTERRUPT STEERING IN MULTIPROCESSOR SYSTEMS

CROSS-REFERENCE TO RELATED APPLICATIONS

This application is a continuation of U.S. patent application Ser. No. 13/917,634, filed Jun. 13, 2013 and entitled "Operating System-Managed Interrupt Steering in Multiprocessor Systems", pending, which is hereby incorporated by reference.

BACKGROUND

All modern computing platforms implement a mechanism called interrupt handling. In general, a device generates a signal, called an interrupt, to the system to request an asynchronous service to be performed. In response to the interrupt, the system executes an interrupt handler. An interrupt handler is a computer program that, when executed by a processor, causes the system to perform the requested service, or other appropriate action, in response to that interrupt. The interrupt handler may in turn schedule additional operations to be performed to assist in responding to, or processing the data associated with, that interrupt.

In modern computing platforms, there typically are several devices that can generate interrupts, each with its own interrupt handler. The rate at which each device generates interrupts generally is variable. The amount of time taken to process each interrupt also can vary.

In a multiprocessor system, each individual interrupt is typically directed at a single processor; however some interrupt architectures allow an interrupt to be directed at a cluster of processors. In general, multiprocessor systems are designed such that interrupts are distributed among a subset of the system's processors while attempting to optimize one or more of overall system throughput, latency and power consumption. For example, in some systems, all interrupts are directed to a dedicated processor that executes the interrupt handlers. In some systems, each device or process that generates an interrupt, i.e., an interrupt source, is statically assigned a processor for its interrupt handler.

In some systems, a hardware-based interrupt controller can dynamically assign each interrupt to one of the processors based on information local to the interrupt controller. In some systems, the interrupt controller assigns a set of processors to handle each interrupt in a round robin fashion among the set of processors, each of which is programmed with the various interrupt handlers. In some systems, the interrupt controller broadcasts each interrupt to a set of processors, each of which selects whether to accept the interrupt. In some systems, the interrupt is directed to the processor, within a subset of processors, which is currently handling the lowest priority task.

SUMMARY

This Summary introduces selected concepts in simplified form that are further described below in the Detailed Description. This Summary is intended neither to identify key or essential features of the claimed subject matter, nor to limit the scope of the claimed subject matter.

An operating system is provided in which an interrupt router dynamically steers each interrupt source to a processor within set of processors based on overall load information from the set of processors. An interrupt source is assigned to a processor based on the load imposed by the associated interrupts and the target overall load for the processor. For example, each processor can maintain information about each interrupt it processes over time. The operating system receives this historical load information to determine an expected load due to interrupts of a given type from a given device, an overall load on the system, and a target load for each processor. Given a set of interrupt sources, their expected loads, and target load for each processor, each interrupt source can be assigned dynamically to a processor during runtime of the system. On a regular basis, these assignments can be changed given current operating conditions of the system. The assignments also can be determined based on the current power state of each processor, so as to avoid activating an idle processor solely to process an interrupt, and to allow processors to become idle, to save power.

One challenge is measuring the overall load due to an interrupt source, because an interrupt handler can invoke additional processing on the same processor in response to handling an interrupt.

Accordingly, in one aspect, in a computer including a plurality of processors, an interrupt router receives information about interrupts. The interrupt router determines a load on the computer due to interrupt handling by the plurality of processors for the interrupts. The interrupt router assigns each interrupt source to a selected one or more of the plurality of processors, such selection being a function of the determined load so as to distribute the load among the processors. The interrupt router can periodically repeat determining a load on the computer due to interrupt handling, and assigning each interrupt source to a selected one of the plurality of processors.

In one implementation, the interrupt router identifies a number of processors, from among the plurality of processors, available for processing interrupts, and selects a number of processors, from among the identified number of processors available for processing interrupts, such that the number of selected processors matches the determined load divided by a target per-processor load. The load can be determined by, in response to each interrupt, executing an interrupt handler for the interrupt on the processor assigned to the interrupt, and storing, in memory associated with the processor assigned to the interrupt, data indicating an amount of processing time consumed due to executing the interrupt handler. The interrupt router aggregates the stored data from the plurality of processors for the interrupts.

The amount of processing time can be determined by storing a system time stamp when beginning execution of the interrupt handler, computing a difference between a system time stamp observed when ending execution of the interrupt handler, and storing the computed difference. Determining the amount of processing time can further include, for any process invoked by the interrupt handler, storing a system time stamp when beginning execution of the process, computing a difference between a system time stamp observed when ending execution of the process, and storing data indicative of the computed difference for the process and the computed difference for the interrupt handler. Determining the amount of processing time can further include, for any preemptive activity, such as an interrupt or other process preempting interrupt processing by another interrupt handler or process performing associated work, computing a difference between system time stamps observed when pausing the preempted interrupt processing and when restarting the preempted interrupt processing to have an amount of time for executing the preemptive activity, such that the computed difference for the interrupt handler excludes the amount of time for executing the preemptive activity.

These various aspects and implementations can be embodied in a computer-implemented process, computer, or an article of manufacture including computer storage media.

In the following description, reference is made to the accompanying drawings which form a part hereof, and in which are shown, by way of illustration, specific example implementations of this technique. It is understood that other embodiments may be utilized and structural changes may be made without departing from the scope of the disclosure.

DETAILED DESCRIPTION

The following section provides an example operating environment in which operating-system based interrupt steering can be implemented.

Figure 1:
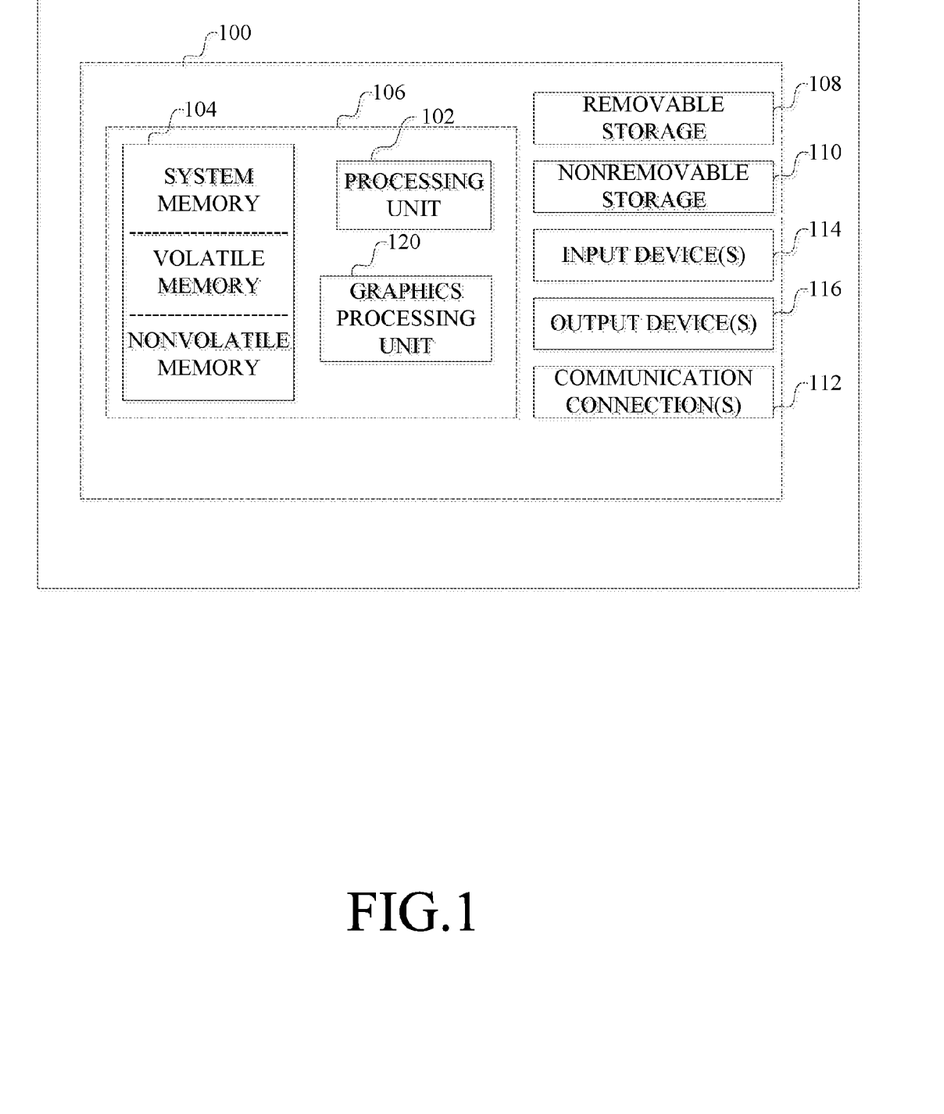
FIG. 1 is a block diagram of an example computer in which operating system-manage interrupt steering can be implemented.

Referring to FIG. 1, the following description is intended to provide a brief, general description of a general purpose computer that may use such an interrupt router. The computer can be any of a variety of general purpose or special purpose computing hardware configurations. Examples of well-known computers that may be suitable include, but are not limited to, personal computers, server computers, handheld or laptop devices (for example, media players, notebook computers, cellular phones, personal data assistants, voice recorders), multiprocessor systems, microprocessor-based systems, set top boxes, game consoles, programmable consumer electronics, network PCs, minicomputers, mainframe computers, distributed computing environments that include any of the above systems or devices, and the like.

FIG. 1 illustrates an example of a suitable computer. This is only one example of a suitable computer and is not intended to suggest any limitation as to the scope of use or functionality of such a computer.

With reference to FIG. 1, an example computer 100, in a basic configuration, includes at least one processing unit 102 and memory 104. The computer may include multiple processing units and/or additional co-processing units such as graphics processing unit 120. Depending on the exact configuration and type of computer, memory 104 may be volatile (such as RAM), non-volatile (such as ROM, flash memory, etc.) or some combination of the two. This configuration is illustrated in FIG. 1 by dashed line 106.

Additionally, computer 100 may also have additional features/functionality. For example, computer 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer program instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the information and which can accessed by computer 100. Any such computer storage media may be part of computer 100.

Computer 100 may also contain communications connection(s) 112 that allow the device to communicate with other devices over a communication medium. Communication media typically carry computer program instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media such as acoustic, RF, infrared and other wireless media. Communications connections 112 are devices that interface with the communication media to transmit data over and receive data from communication media, such as a network interface.

Computer 100 may have various input device(s) 114 such as a keyboard, mouse, pen, camera, touch input device, and so on. Output device(s) 116 such as a display, speakers, a printer, and so on may also be included. All of these devices are well known in the art and need not be discussed at length here. Various input and output devices can implement a natural user interface (NUI), which is any interface technology that enables a user to interact with a device in a "natural" manner, free from artificial constraints imposed by input devices such as mice, keyboards, remote controls, and the like.

Examples of NUI methods include those relying on speech recognition, touch and stylus recognition, gesture recognition both on screen and adjacent to the screen, air gestures, head and eye tracking, voice and speech, vision, touch, gestures, and machine intelligence, and may include the use of touch sensitive displays, voice and speech recognition, intention and goal understanding, motion gesture detection using depth cameras (such as stereoscopic camera systems, infrared camera systems, and other camera systems and combinations of these), motion gesture detection using accelerometers or gyroscopes, facial recognition, three dimensional displays, head, eye, and gaze tracking, immersive augmented reality and virtual reality systems, all of which provide a more natural interface, as well as technologies for sensing brain activity using electric field sensing electrodes (EEG and related methods).

Each component of this system that operates on a computer generally is implemented by software, such as one or more computer programs, which include computer-executable instructions and/or computer-interpreted instructions, such as program modules, being processed by the computer. Generally, program modules include routines, programs, objects, components, data structures, and so on, that, when processed by a processing unit, instruct the processing unit to perform particular tasks or implement particular abstract data types. This computer system may be practiced in distributed computing environments where tasks are performed by remote processing devices that are linked through a communications network. In a distributed computing environment, program modules may be located in both local and remote computer storage media including memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Given a computer such as described above, an operating system based interrupt router that performs dynamic interrupt steering at runtime among multiple processors assumes that the computer includes a central processing unit (e.g., 120 in FIG. 1) above with multiple processors. The use of the term "processor" herein is intended to include any logical processor, including but not limited to a single instance of a hardware processor, one of multiple processors, a "core" in a multiple core processor or any other processing unit that can be managed independently of other processing units.

Interrupt handling generally is managed by the operating system, firmware or other low level software on the computer. In one implementation, the operating system includes an interrupt router in the kernel that is executed on one or more of the processors and that dynamically steers interrupts to a subset of processors which may include the processor on which the interrupt router is executed. Alternatively, other components of an operating system, hardware abstraction layer, firmware or other low level computer programs of a computer can implement such functionality.

Figure 2:
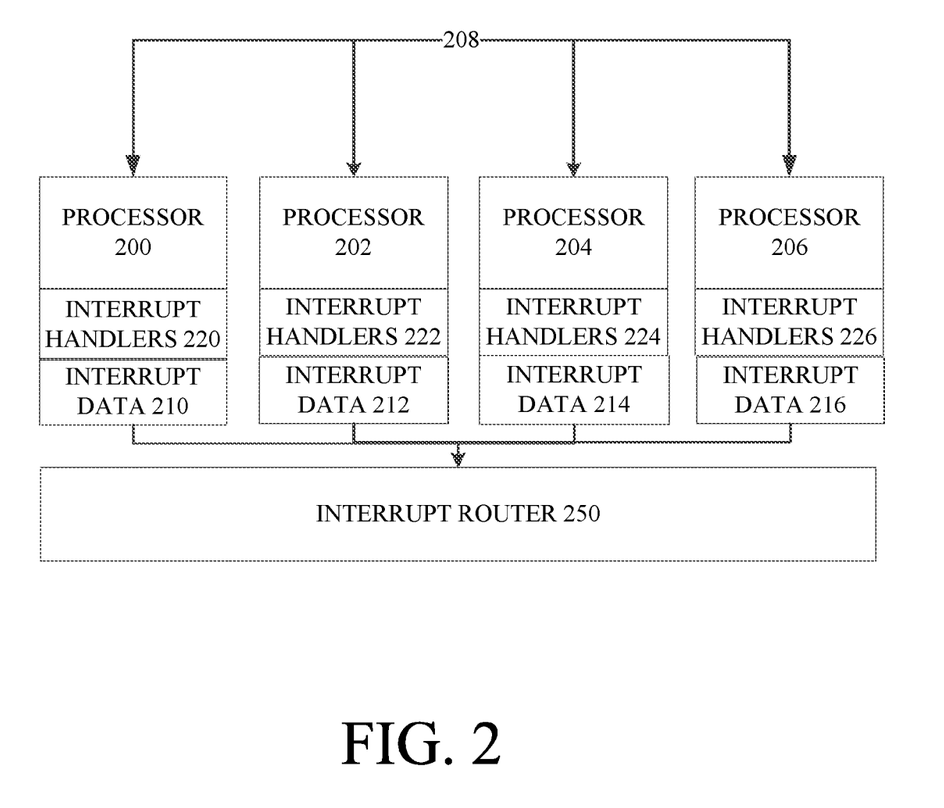
FIG. 2 is a block diagram of an example multi-processor system implementing an operating system-based interrupt router.

Referring now to FIG. 2, an example implementation of such a system will now be described in the context of an illustrative example. In FIG. 2, there are four processors 200, 202, 204 and 206, interconnected by a bus 208, each with a respective interrupt data 210, 212, 214 and 216 for tracking information about interrupts processed by that processor. Each processor also has a set of one or more interrupt handlers 220, 222, 224, 226, respectively, for processing interrupts from various interrupt sources. The system also includes an interrupt router 250 which is part of the operating system that manages access to the resources in the multiprocessor computer. The interrupt router 250 periodically obtains the interrupt data 210, 212, 214, 216 from the processors. The interrupt router may be a software component executing on one or more of the processors, or may be implemented or supported by hardware components. The interrupt router determines an interrupt source-to-processor assignment based on the interrupt data, and sets an interrupt controller (not shown) with the assignments to direct interrupts in the system to their assigned processors.

It should be understood that the number of processors, i.e., four, in FIG. 2 is merely illustrative and not limiting of the present invention. Further, interrupt routing can be performed by a subset of the processors in the system. FIG. 2 illustrates merely an example of a subset of the processors of a multiprocessor system that participate in interrupt routing.

Figure 3:
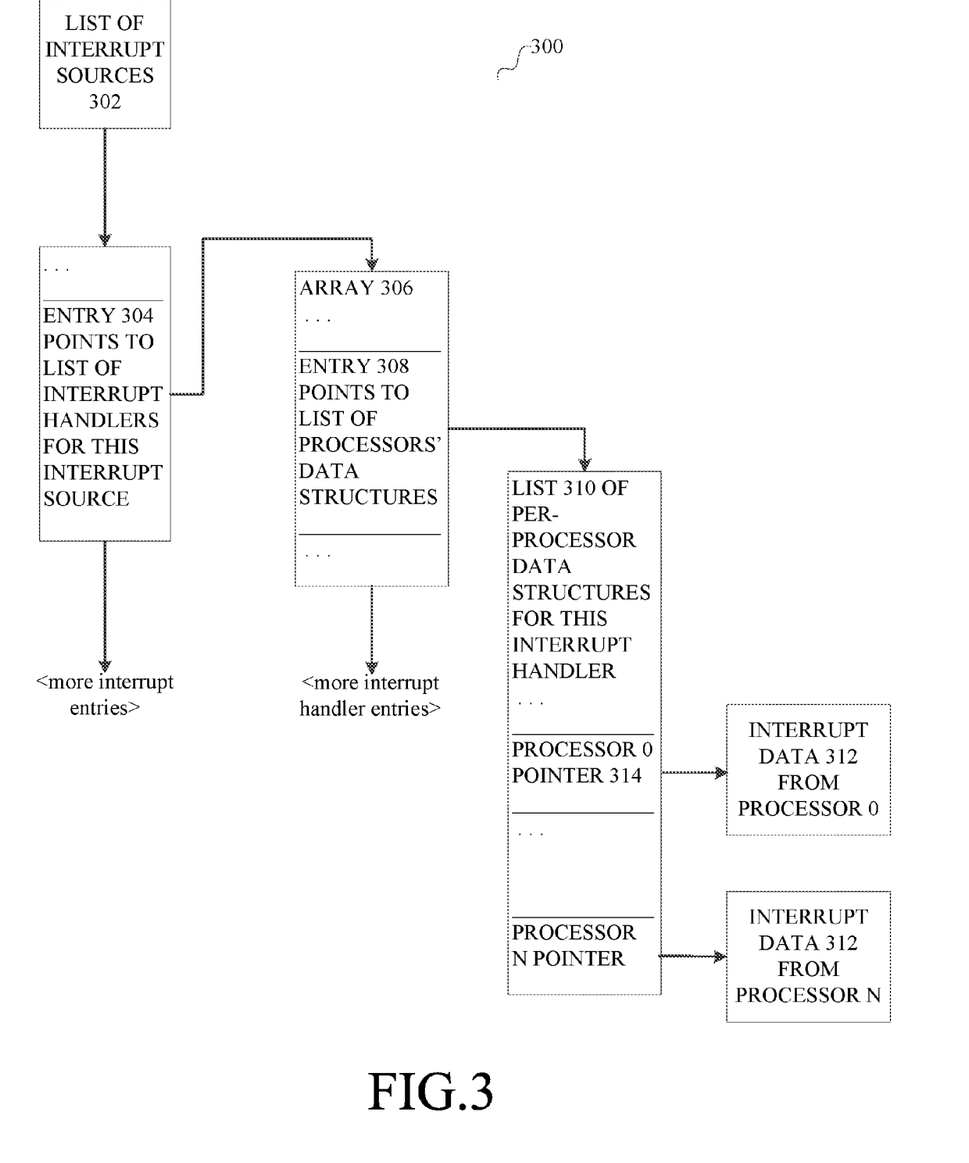
FIG. 3 illustrates a data structure used in tracking interrupt handlers on processors.

Referring now to FIG. 3, an example implementation of a data structure 300 maintained and used by interrupt router 250 for aggregating interrupt data from multiple processors, will now be described. The data structure 300 includes a list 302 of interrupt sources. Each entry 304 in the list 302 represents an interrupt source and points to an array 306 representing the interrupt handler(s) for interrupts from that source. The array 306 includes an entry 308 that represents each interrupt handler. The entry 308 points to a list 310 of pointers 314 to data structures 312 maintained by each processor for that interrupt handler for storing the interrupt data for that processor, which includes data about the load placed on the processor related to that interrupt handler. How this data structure is used by each processor and the interrupt router to monitor current system status will be described in more detail below. It should be understood that other data structures can be used to aggregate and store the per-processor, per-interrupt handler performance data for use by the interrupt router and that the foregoing is merely an example.

Other data structures, not shown, include, for each processor, a count of the number of interrupt sources assigned to the processor as part of the interrupt data for each processor. Additionally, a current list of interrupt source-to-processor assignments also is stored by the interrupt router.

Steering of interrupts to different processors generally involves four steps. First, the interrupt router identifies which processors, of the available processors in the system, are to be used. Second, the interrupt router determines how to distribute interrupts among the identified processors. This interrupt source-to-processor assignment is set in an interrupt controller and used for a period of time. Third, the interrupt router dynamically changes the distribution of interrupts in response to system conditions during runtime. The result of this process changes the current interrupt source-to-processor assignments to new assignments. Fourth, the interrupt router tracks the impact of the interrupts from the various interrupt sources on system performance, which is used to determine future interrupt source-to-processor assignments. It should be understood that the process may assign interrupt sources to individual processor clusters as well as or instead of individual processors.

Figure 4:
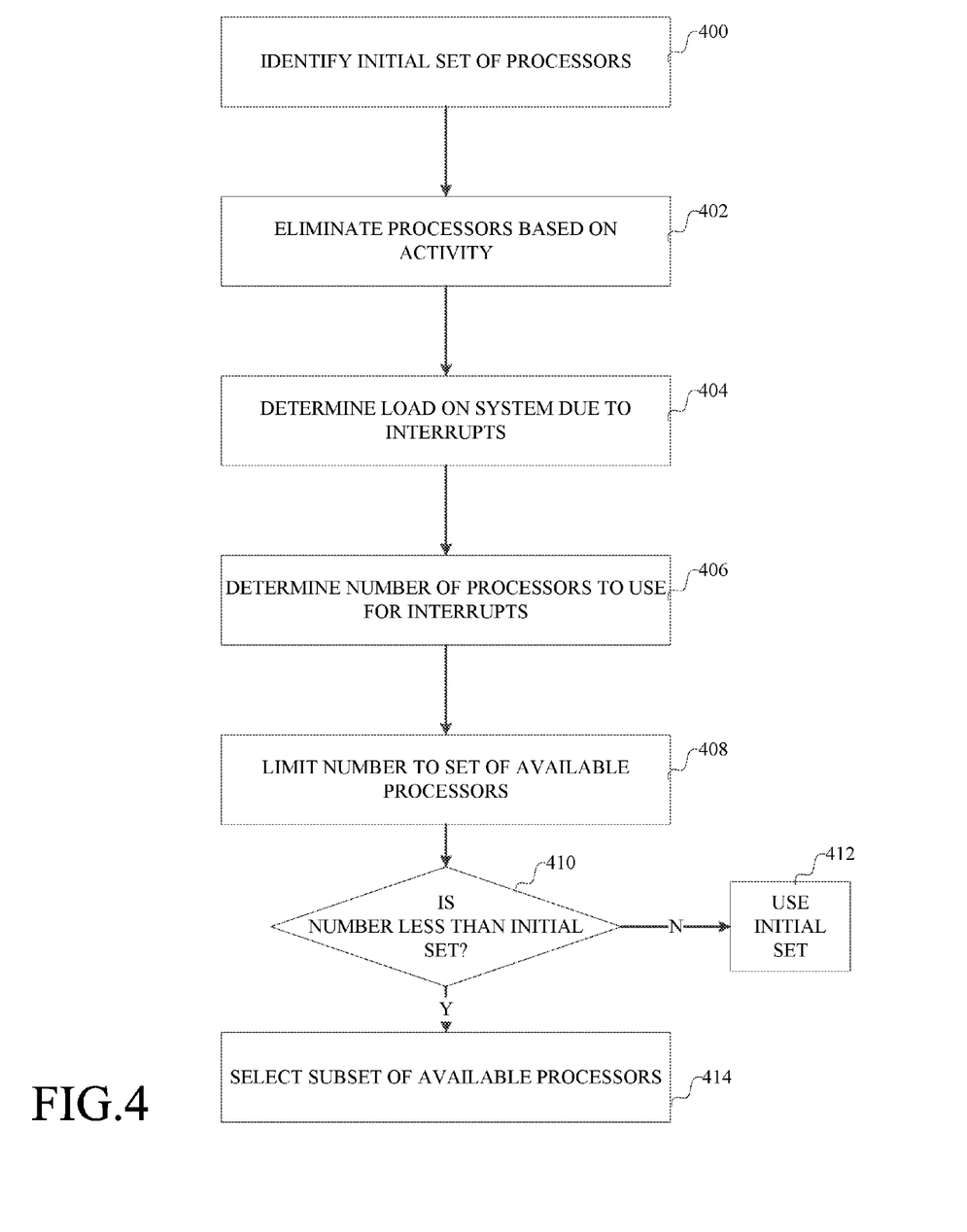
FIG. 4 is a flow chart of an example implementation of identifying available processors to assign to interrupt sources.

Referring now to FIG. 4, an example implementation of a way to identify processors to be used for handling interrupts will now be described. The output of this process is an indication of the set of processors to which interrupts are distributed.

This process begins by identifying 400 an initial set of available processors. This initial set can be all of the available processors, a predetermined subset of the available processors, or other set of processors identified based on a specified characteristic. As an example, the initial set of processors can be all active, i.e., non-idle, processors. Next, some of these processors can be eliminated 402 based on the time for which they have been active. The amount of time can be a tunable parameter, which, when set to zero, disables this step.

The interrupt router then determines 404 the load on the system due to interrupt handling, in a manner described in more detail below. Then, a number of processors to be used for handling interrupts, given a target per-processor load and the determined load, is then computed 406.

In one example implementation, a total sum of all processor time used to handle all interrupt-related work is computed. This total amount of time is divided by the actual elapsed time for the entire system to process the interrupts, to determine a percent of time spent processing interrupts and related work. This percent of time is then divided by a target per-processor load, which can be a tunable parameter, to determine a target number of processors to handle that load. For example, if each of eight processors handled interrupts for 20 ms, the total load is 160 ms. If this processing occurred in 100 ms, then the total load is 160% (of one of the processors). If the target processing load is 40%, then the target number of processors is four.

Other algorithms can be used to select the number of processors. For example, statistics about which interrupt sources are primarily responsible for the load can be examined. If one interrupt source is responsible for a load that is significantly greater than the target per-processor load, then it is possible that this interrupt source can be assigned to one processor and fewer processors can be used for the remaining interrupts.

The computed number can be capped 408 to the number of processors in the initial set of processors identified at 400. If this number of processors is less than the size of the initial set, as determined at 410, then a subset of the initial set is selected 412.

In one example implementation, the subset can be selected by using a same algorithm used by the kernel to assign threads to processors thus maximizing a number of processors that can be idle to reduce power consumption.

In this example implementation, a set of processors is selected (see FIG. 4) and then interrupts are distributed among the selected processors. An example implementation of this distribution process will now be described in connection with FIG. 5.

Figure 5:
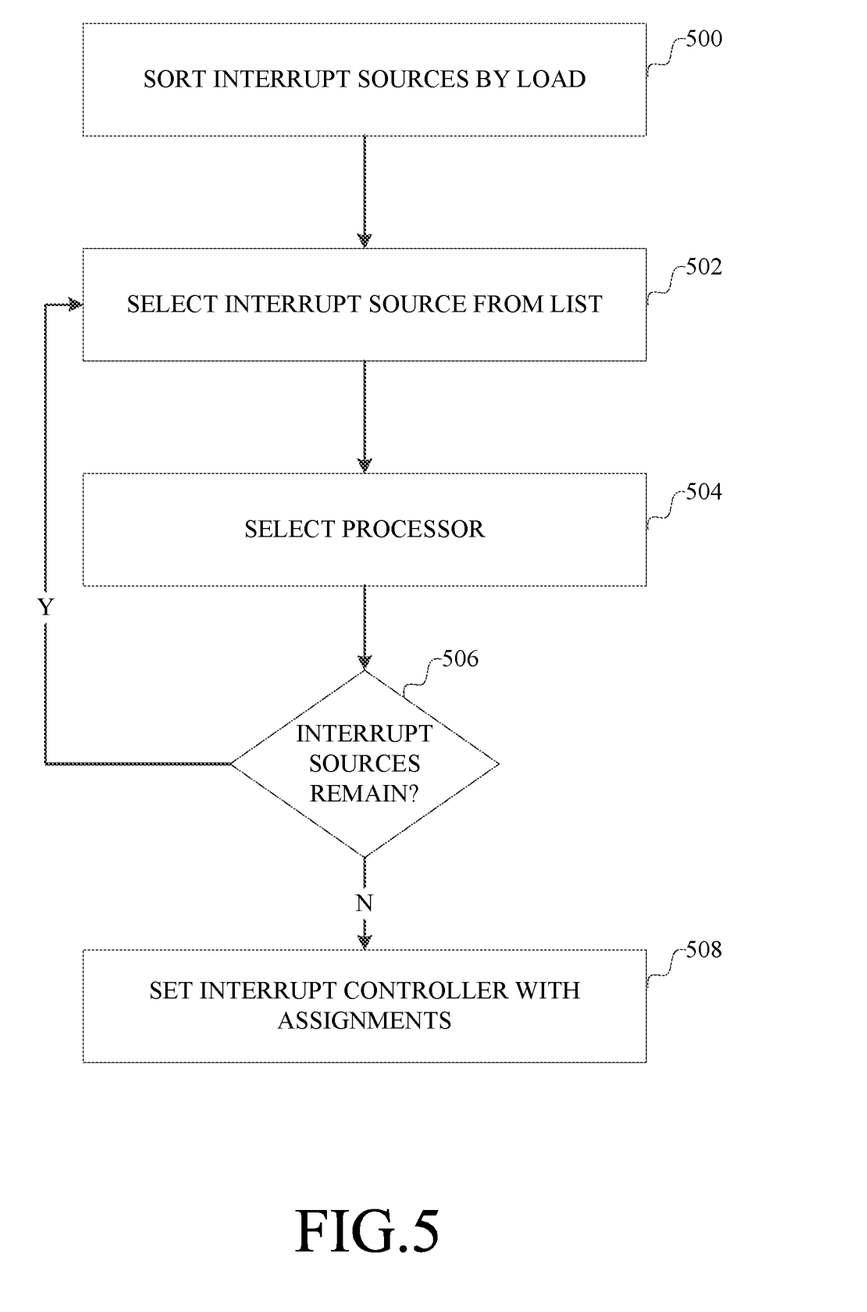
FIG. 5 is a flow chart of an example implementation of assigning interrupt sources to processors.

First, interrupt sources are sorted 500 in order of the load imposed on the system by the interrupt source. Next, an interrupt source from the list is selected 502. A processor from the set of processors is selected 504 and assigned to the selected interrupt source in the sorted list. If interrupt sources remain, as determined in 506, the process continues by repeating the selection steps 502 and 504, until all interrupt sources are assigned one of the processors. After assignments are completed, the interrupt controller is set 508 to direct interrupts to their assigned processors.

There are a variety of different ways to match processors and interrupts, and the process in FIG. 5 is merely one way of implementing such a matching.

Using the example of FIG. 5, the selection of the interrupt source in step 502 and the selection of a processor in step 504 can be performed using the following example implementation. The processors are selected in a serpentine manner: stepping through the list from beginning to end and then from the end to the beginning, and so on, assigning the next interrupt source in the sorted list to the selected processor, until all of the interrupt sources are assigned.

Other implementations are possible, with the general objective of evenly dividing the load due to handling interrupts among the processors, trading off computational complexity against a more optimal distribution.

In one example, a worst-fit bin packing algorithm can be used. In this algorithm, each subsequent interrupt source is assigned to the processor that will have the least total load after the assignment.

In another example, the serpentine selection of the next processor is followed, with the condition that the current processor has a higher total load than the next processor; otherwise the current processor is used again for the next interrupt.

In another example, an entire processor is first reserved for each interrupt for which the load is greater than the target per-processor load. Then, the remaining interrupts are assigned to the remaining processors.

In another example, interrupt sources having little impact on the system can be assigned permanently to certain processors and removed from this process of assigning interrupt sources to processors.

Given an assignment of interrupt sources and processors, this assignment can be dynamically changed during operation of the computer as system conditions change. The result of this process is to allow the system to transition active processors into idle states and idle processors into active states, while not missing interrupts.

Figure 6:
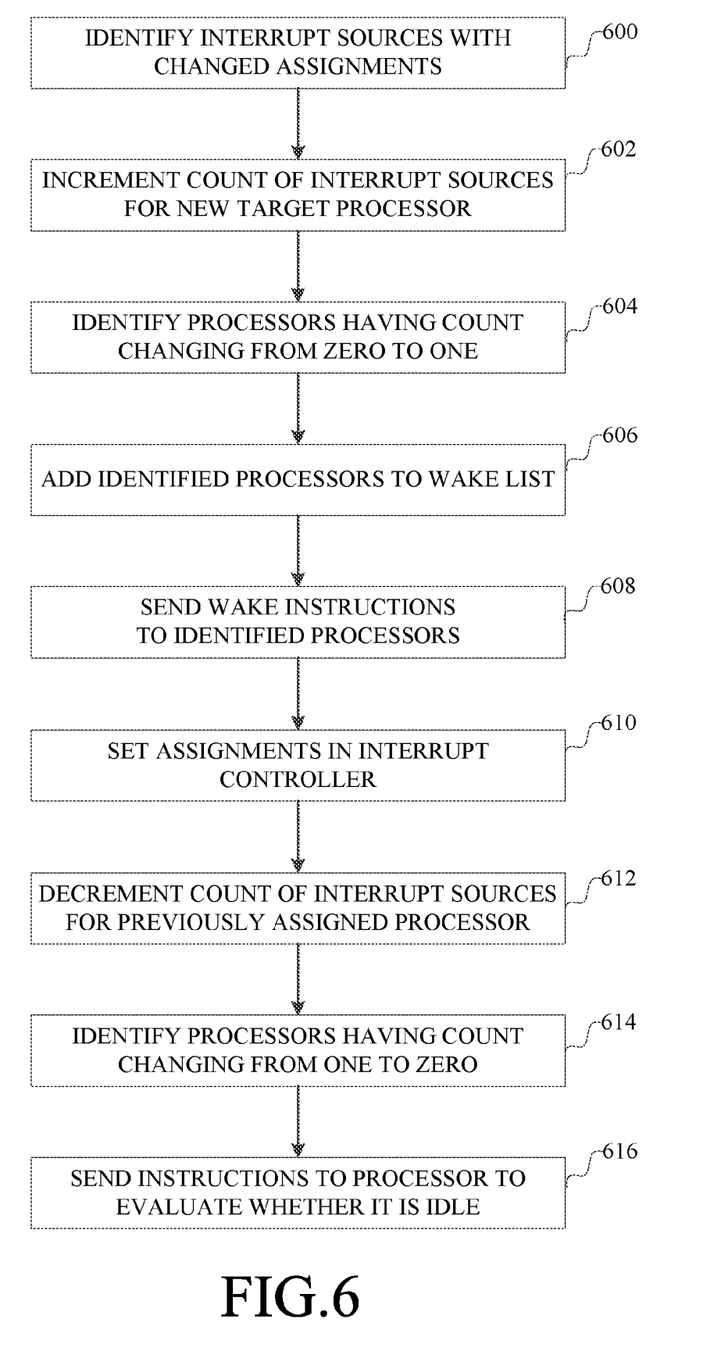
FIG. 6 is a flow chart of an example implementation of reassigning interrupt sources to processors.

An example implementation is shown in FIG. 6. Other implementations are possible, and depend on the nature of the processors being used. In the implementation shown in FIG. 6, the processors have both non-interruptible and interruptible idle states, and, in either idle state, a "wake" command is issued to the processor in order to query the processor and/or cause it to change state. In general, the process involves identifying the differences between the current interrupt source-to-processor assignments and the new interrupt source-to-processor assignments, and determining whether any of these differences involve changing the state of the processor. If a processor has a state change, the state is changed before allowing interrupt sources to be assigned to it.

Thus, in FIG. 6, in this implementation, each interrupt source-to-processor assignment is processed 600 to identify interrupt sources for which the target processor changed. For each interrupt source for which the current target processor is to be changed, the count of interrupt sources for the new target processor is incremented 602. On each such increment, if the target processor's count of interrupt sources changes from zero to one, as determined in 604, the processor is added 606 to a list of processors to be "awakened". "Wake" instructions then are sent 608 to each processor on this list. In some implementations, waiting for an acknowledgement from the processor ensures that an interrupt is not lost.

Each interrupt source-to-processor assignment is again processed 610 and the current assignment is set to the new assignment in the interrupt controller. For each interrupt source where the target processor changed, the count of interrupt sources assigned to the previous target processor for that interrupt is decremented 612. On each such increment, if the previous target processor's count of interrupt sources changes from one to zero, as determined at 614, the processor is added to a list. Instructions are then sent 616 to each processor on this list, in response to which each processor can evaluate whether it is idle and can transition into a power saving state due to no longer having any interrupts targeted at it.

The process in FIG. 6 can be modified depending on how the processors handle interrupts, power saving states, and transitions among those states. The state of each processor can be identified during this process. For example, if processors do not support wake commands or non-interruptible states, then other steps can be eliminated.

Figure 7:
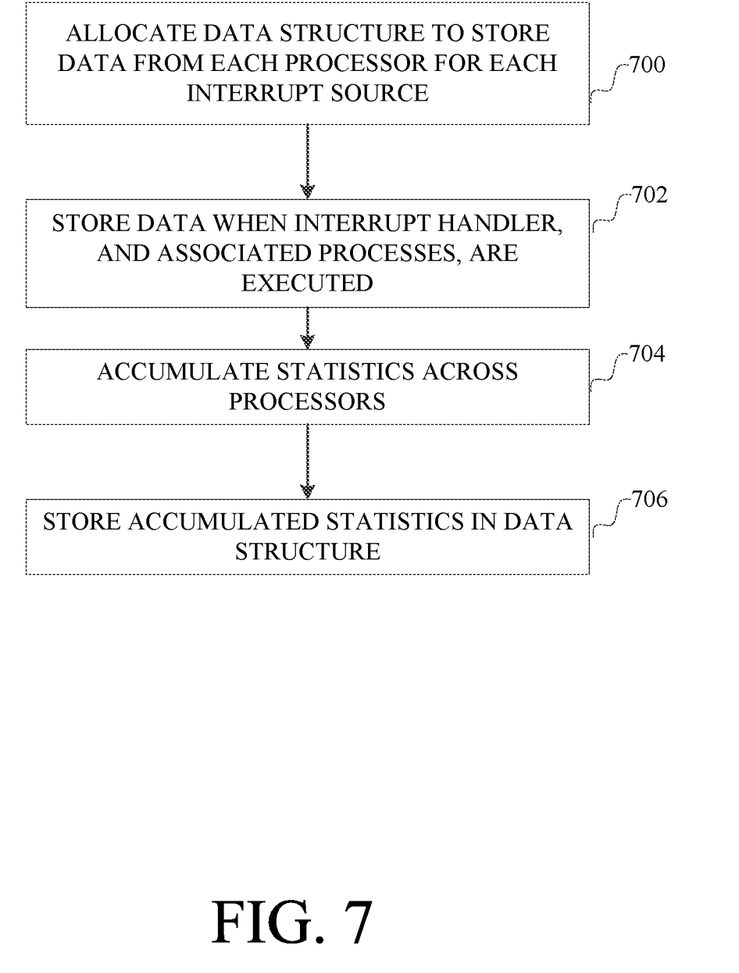
FIG. 7 is a flow chart of an example implementation of tracking impact of interrupt sources on a computer system.

An example implementation of a process for tracking the impact of interrupt handling as associated work on the system will now be described in connection with FIG. 7.

A challenge with measuring the impact of interrupts is the fact that an interrupt handler can invoke additional processes and generate additional interrupts, or other work generated by an interrupt handler that is performed on the same processor as the interrupt handler. Such additional work, in turn, can create yet more additional work on a processor. Measurement and tracking of such work uses the data structure described above, an example of which is shown in FIG. 3.

For each interrupt source and processor in the system, fields are allocated 700 in this data structure to accumulate the amount of time consumed by the interrupt source's associated interrupt handler and any additional work it invokes on the processor.

When an interrupt handler is executed, the amount of time it spends executing is tracked and stored 702 on its processor. For example, a time stamp is read both prior to and after such execution. The difference is calculated and stored in the data structure. If the interrupt handler schedules additional work, such as by invoking another process, the amount of time the additional work is performed also is determined. For example, when additional work is queued on the processor, a pointer to the data structure can be queued along with that work. If the interrupt handler, or its related work, is preempted by another higher priority task, then the higher priority task adjusts the time stamp data of the preempted interrupt handler or related work.

Periodically, the interrupt data from the processors is accumulated 704 by the interrupt router, and stored 706 in the allocated data structure so as to accumulate the interrupt handling statistics across the system.

It should be understood that the foregoing is only an example implementation and that other implementations of tracking also are possible. In general, each interrupt handler and its additional work track the amount of time spent processing the related interrupt. This data is collected over the multiple interrupts and multiple processors.

With such information, interrupt sources can be dynamically assigned to processors, and such assignments can be dynamically changed, during runtime of the computer. By managing the assignments efficiently, interrupts can be distributed among processors while maximizing a number of processors that can be idle to reduce power consumption.

Any or all of the aforementioned alternate embodiments described herein may be used in any combination desired to form additional hybrid embodiments. It should be understood that the subject matter defined in the appended claims is not necessarily limited to the specific implementations described above. The terms "article of manufacture", "process", "machine" and "composition of matter" in the preambles of the appended claims are intended to limit the claims to subject matter deemed to fall within the scope of patentable subject matter defined by the use of these terms in 35 U.S.C. § 101. The specific implementations described above are disclosed as examples only.

What is claimed is:

1. A computer-implemented process performed by a computer including a processing device comprising a plurality of processors, comprising:
    periodically receiving into a data structure in memory for an interrupt router, from the plurality of processors, data indicating an amount of processing time consumed by the plurality of processors due to executing interrupt handlers;
    the interrupt router determining a load on the processing device due to interrupt handling by the plurality of processors based on at least the received data; and
    assigning, by the interrupt router, each interrupt source of a plurality of interrupt sources to a selected respective processor from among the plurality of processors, the plurality of interrupt sources having a corresponding plurality of interrupt handlers based on at least a function of the determined load so as to distribute the load among the processors while maximizing a number of processors that are idle; and
    repeating determining the load and assigning each interrupt source based on the periodically received data.

2. The computer-implemented process of claim 1, further comprising:
    the interrupt router further periodically receiving and storing, in the data structure, data indicating an amount of processing time consumed by any processes invoked by the interrupt handlers.

3. The computer-implemented process of claim 1, wherein assigning comprises:
    the interrupt router identifying a number of processors, from among the plurality of processors, available for processing interrupts;
    the interrupt router selecting a number of processors, from among the identified number of processors available for processing interrupts, such that the number of selected processors matches the determined load divided by a target per-processor load.

4. The computer-implemented process of claim 1, further comprising: the interrupt router aggregating, by interrupt source, the data received from the plurality of processors.

5. The computer-implemented process of claim 1, further comprising each processor determining the amount of processing time consumed by the respective processor for executing interrupt handlers by:
    storing a system time stamp when beginning execution of the interrupt handler;
    computing a difference between a system time stamp observed when ending execution of the interrupt handler; and
    storing the computed difference.

6. The computer-implemented process of claim 5, wherein each processor determining the amount of processing time further comprises:
    for any process invoked by the interrupt handler,
    storing a system time stamp when beginning execution of the process;
    computing a difference between a system time stamp observed when ending execution of the process; and
    storing data indicative of the computed difference for the process and the computed difference for the interrupt handler.

7. The computer-implemented process of claim 6, wherein each processor determining the amount of processing time further comprises:
    for any preemptive activity preempting interrupt processing by the interrupt handler and associated processes on the respective processor,
    computing a difference between system time stamps observed when pausing the preempted interrupt processing and when restarting the preempted interrupt processing to have an amount of time for executing the preemptive activity; and
    wherein the computed difference for the interrupt handler excludes the amount of time for executing the preemptive activity.

8. An article of manufacture comprising:
    a computer storage medium comprising at least a memory or a storage device;
    computer program instructions stored on the computer storage medium which, when read from storage and processed by a processing device including a plurality of processors, instruct the processing device to perform a process comprising:

periodically receiving into a data structure in memory for an interrupt router, from the plurality of processors, data indicating an amount of processing time consumed by the plurality of processors due to executing interrupt handlers;

the interrupt router determining a load on the processing device due to interrupt handling by the plurality of processors based on at least the received data; and assigning, by the interrupt router, each interrupt source of a plurality of interrupt sources to a selected respective processor from among the plurality of processors, the plurality of interrupt sources having a corresponding plurality of interrupt handlers based on at least a function of the determined load so as to distribute the load among the processors while maximizing a number of processors that are idle; and repeating determining the load and assigning each interrupt source based on the periodically received data.

9. The article of manufacture of claim 8, wherein the process further comprises:

the interrupt router further periodically receiving and storing, in the data structure, data indicating an amount of processing time consumed by any processes invoked by the interrupt handlers.

10. The article of manufacture of claim 8, wherein assigning comprises:

the interrupt router identifying a number of processors, from among the plurality of processors, available for processing interrupts;

the interrupt router selecting a number of processors, from among the identified number of processors available for processing interrupts, such that the number of selected processors matches the determined load divided by a target per-processor load.

11. The article of manufacture of claim 8, wherein the process further comprises: the interrupt router aggregating, by interrupt source, the data received from the plurality of processors.

12. The article of manufacture of claim 8, further comprising each processor determining the amount of processing time consumed by the respective processor for executing interrupt handlers by:

storing a system time stamp when beginning execution of the interrupt handler;

computing a difference between a system time stamp observed when ending execution of the interrupt handler; and storing the computed difference.

13. The article of manufacture of claim 12, wherein each processor determining the amount of processing time further comprises:

for any process invoked by the interrupt handler, storing a system time stamp when beginning execution of the process;

computing a difference between a system time stamp observed when ending execution of the process; and storing data indicative of the computed difference for the process and the computed difference for the interrupt handler.

14. The article of manufacture of claim 13, wherein each processor determining the amount of processing time further comprises:

for any preemptive activity preempting interrupt processing by the interrupt handler and associated processes on the respective processor, computing a difference between system time stamps observed when pausing the preempted interrupt processing and when restarting the preempted interrupt processing to have an amount of time for executing the preemptive activity; and wherein the computed difference for the interrupt handler excludes the amount of time for executing the preemptive activity.

15. A computer comprising:

a processing device comprising a plurality of processors, a plurality of interrupt sources, the plurality of interrupt sources having a corresponding plurality of interrupt handlers;

an interrupt router executed on one or more of the plurality of processors, the interrupt router being configured to:

periodically receive, into a data structure in a memory for the interrupt router, from the plurality of processors, data indicating an amount of processing time consumed by the plurality of processors due to executing the interrupt handlers;

determine a load on the processing device due to interrupt handling by the plurality of processors based on at least the received data; and assign each interrupt source of the plurality of interrupt sources to a selected processor among the plurality of processors based on at least a function of the determined load so as to distribute the load among the processors while maximizing a number of processors that are idle; and repeat determining the load and assigning each interrupt source based on the periodically received data.

16. The computer of claim 15, wherein the interrupt router is further configured to:

periodically receive and store, in the data structure, data indicating an amount of processing time consumed by any processes invoked by the interrupt handlers.

17. The computer of claim 15, wherein to assign each interrupt source to a respective processor, the interrupt router is configured to identify a number of processors, from among the plurality of processors, available for processing interrupts, and select a number of processors, from among the identified number of processors available for processing interrupts, such that the number of selected processors matches the determined load divided by a target per-processor load.

18. The computer of claim 15, wherein each processor is configured to, in response to each interrupt from an interrupt source assigned to the processor, execute an interrupt handler for the interrupt, and store, in memory associated with the processor, data indicating an amount of processing time consumed due to executing the interrupt handler;

wherein the interrupt router is configured to aggregate stored data from the plurality of processors for the interrupts.

19. The computer of claim 15, wherein each processor stores a system time stamp when beginning execution of an interrupt handler, computes a difference between a system time stamp observed when ending execution of the interrupt handler, and stores the computed difference.

20. The computer of claim 19, wherein a processor, for any process invoked by the interrupt handler assigned to the processor, stores a system time stamp when beginning execution of the process, computes a difference between a system time stamp observed when ending execution of the process, and stores data indicative of the computed difference for the process and the computed difference for the interrupt handler.

\* \* \* \* \*